United States Patent [19]

Maru

[11] 4,250,231
[45] Feb. 10, 1981

[54] ACID ELECTROLYTE FUEL CELL METHOD HAVING IMPROVED CARBON CORROSION PROTECTION

[75] Inventor: Hansraj C. Maru, Brookfield Center, Conn.

[73] Assignee: Energy Research Corporation, Danbury, Conn.

[21] Appl. No.: 23,097

[22] Filed: Mar. 23, 1979

[51] Int. Cl.³ .......................................... H01M 8/04
[52] U.S. Cl. ........................................ 429/13; 429/40
[58] Field of Search .................... 429/13, 22, 46, 12, 429/40

[56] References Cited

U.S. PATENT DOCUMENTS

| | | | |
|---|---|---|---|
| 3,239,383 | 3/1966 | Hauel | 429/46 |
| 3,375,138 | 3/1968 | Mather | 429/13 |
| 3,556,857 | 6/1971 | Poirier et al. | 429/13 |

*Primary Examiner*—Donald L. Walton
*Attorney, Agent, or Firm*—Watson, Leavenworth, Kelton & Taggart

[57] ABSTRACT

Carbon containing members susceptible to corrosion in an acid electrolyte fuel cell are protected against such corrosion through the practice of supplying carbon dioxide gas to the fuel cell regions adjacent these members.

7 Claims, 3 Drawing Figures

ACID ELECTROLYTE FUEL CELL METHOD HAVING IMPROVED CARBON CORROSION PROTECTION

BACKGROUND OF THE INVENTION

This invention relates to fuel cells containing members comprised of carbon and, in particular, to techniques for inhibiting the corrosion of such members.

As is well known, fuel cells typically comprise an anode electrode for providing free positive ions upon exposure to a reactant fuel gas, an electrolyte for conveying these generated free ions and a cathode electrode for receiving the conveyed free ions in the presence of a reactant oxidant gas. In fuel cells of this type, strong acids such as, for example, phosphoric acid, are often employed as the ion carrying electrolyte. The anode and/or cathode electrodes, in turn, are often formed from carbon containing members, since carbon is compatible with the acid electrolyte environment. For example, carbon might be used to form an interior support for the catalyst in these electrodes.

It has been found, however, that even carbon containing members are susceptible to corrosion after long periods of time in the fuel cell environment. This corrosion is further aggravated when the fuel cell is operated at high temperatures and pressures (e.g., above about 375° F. and in excess of about three atmospheres in a phosphoric acid cell) to achieve better performance. Higher fuel cell operating potentials (e.g., above about 0.8 volts in a phosphoric acid cell) also contribute to increased corrosion, these potentials being encountered when the fuel cell is operated at high temperatures and pressures to obtain high efficiencies and also at no load and partial load conditions. Finally, it has been established that this type of corrosion is more pronounced in the fuel cell oxidant gas cathode region.

To date a variety of techniques have been devised to counteract the above-discussed carbon corrosion in acid electrolyte fuel cells. These techniques have focussed on the carbon itself and have involved the development of different types of carbons such as, for example, synthesized carbons and glassy carbons, and the application of different heat treatments, such as different degrees of graphitization, to existing carbons.

It is an object of the present invention to provide a fuel cell having an improved resistance to carbon corrosion.

It is a further object of the present invention to provide a fuel cell having a gas environment suitably modified to realize improved carbon corrosion resistance.

SUMMARY OF THE INVENTION

In accordance with the principles of the present invention, the above and other objectives are realized in a practice wherein carbon dioxide gas is supplied to an acid electrolyte fuel cell region containing a carbon member susceptible to corrosion in sufficient amount to substantially inhibit such corrosion.

Although the science of carbon corrosion in an acid electrolyte fuel cell is not well understood, it is recognized that the corrosion of the carbon containing members of the cell is more pronounced in the cathode cell region due to the presence of oxidant gas and high operating potentials in such region. In its preferable form, the present invention contemplates the addition of carbon dioxide gas to the cathode cell region in sufficient amount to suppress corrosion of the carbon containing members situated therein. In this form of the invention, where the anode exhaust gas itself contains carbon dioxide, as when the reactant fuel gas is derived from hydrocarbon feedstocks, a portion of the aforesaid exhaust gas can be coupled to the cathode region to serve as the carbon dioxide supply.

It is further preferable with the present invention to add carbon dioxide gas to the region adjacent the carbon containing member in an amount which results in the carbon dioxide gas content in the region being greater than 1 percent but less than about 10 percent of the other gaseous constituents in the region.

BRIEF DESCRIPTION OF THE DRAWINGS

The above and other features and aspects of the present invention will become more apparent upon reading the following detailed description in conjunction with accompanying drawings, in which.

DETAILED DESCRIPTION

Figure 1:
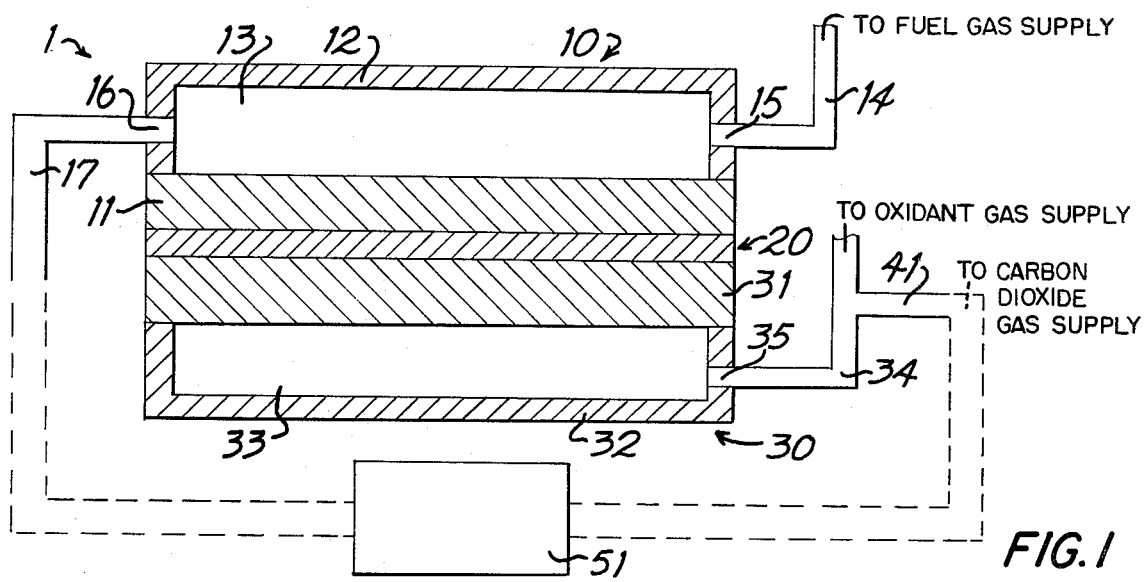
FIG. 1 illustrates a single fuel cell in accordance with the principles of the present invention.

FIG. 1 illustrates a fuel cell 1 in accordance with the principles of the present invention. In practice, an actual fuel cell comprises a multiplicity of such cells, but for the purpose of simplifying the discussion, only a single cell is depicted in FIG. 1. As shown, the cell comprises an anode region 10, an electrolyte region 20 and a cathode region 30. In conventional manner, the anode region 10 comprises an anode electrode 11 over which is situated a fuel gas separator plate 12 forming a chamber 13 for guiding fuel gas to such electrode. The fuel gas is supplied to chamber 13 through a fuel gas supply line 14 which communicates with an inlet opening 15 in the plate 12. Fuel gas after reacting with the anode electrode 11 is exhausted through an exhaust gas opening 16 which communicates with an external exhaust gas line 17.

The cathode region 30 also in conventional manner includes a cathode electrode 31 over which is situated an oxidant gas separator plate 32. The plate 32 forms a further chamber 33 of the cell for coupling oxidant gas to the electrode 31. A supply line 34 receives oxidant gas from a source (not shown) and couples the same to the chamber via an inflow opening 35 in the separator plate wall. After reacting with the cathode electrode 31, the oxidant gas is exhausted through an exhaust gas line (not shown).

The electrolyte region 20 is sandwiched between the anode and cathode regions and comprises a strong acid electrolyte such as, for example, phosphoric acid. This acid may be in free liquid form or contained in a matrix which is disposed between the electrodes.

The cathode region 30 is further of a type wherein the region is provided with a carbon containing member. In the present illustrative case, the cathode electrode 31 serves as such member, it being formed in a conventional manner from an interior carbon support over which has been placed a suitable catalyst. With the cathode electrode so formed, after a period of operation of the cell 1, corrosion of the carbon support member and, thus, the electrode, due to the oxidant gas in the cathode region, will normally occur.

In accordance with the principles of the present invention, the cell 1 is further adapted to substantially inhibit or prevent this corrosion of the carbon containing member. More particularly, in further accord with the invention, this is realized by the further introduction of a quantity of carbon dioxide gas into the cathode region adjacent the electrode 31. In the present illustrative embodiment, the added carbon dioxide gas is fed into this region through a carbon dioxide feed line 41 which connects into the cathode supply line 34. The in-fed carbon dioxide gas, thus, enters the chamber 33 along with the oxidant gas and therewith is exposed to the electrode 31.

The presence of the added carbon dioxide gas in the cathode region will tend to suppress corrosion of the carbon support of the electrode 31. As a result, carbon corrosion will be significantly inhibited and useful cell operating life extended.

Preferably, so as not to disturb normal cell operation in the cathode region, the amount of added carbon dioxide should be maintained at a level to ensure that the added carbon dioxide is less than about 10 percent of the total gas volume entering the cathode chamber 33. On the other hand, it is further preferable that the level be maintained so that the carbon dioxide gas is greater than about 1 percent of such total volume. With this range for the added carbon dioxide gas, substantial carbon corrosion suppression will occur without any significant effect on normal cell activity.

While the source of carbon dioxide gas used to supply feed line 41 may be an external source of gas, advantageously, where a suitable gas is used as the cell fuel gas, the carbon dioxide source may be provided by coupling an appropriate amount of the anode exhaust gas from the exhaust line 17 to the feed line 41. In particular, where the fuel gas is produced from hydrocarbons, for example, where the fuel gas is from a natural gas feedstock, an appropriate gas line valve control mechanism 51 can be provided to couple the lines 17 and 41 and, thereby, convey a given amount of the exhaust gas containing carbon dioxide to the cathode region.

Another possible way of coupling the anode exhaust to the cathode region would be to substitute a carbon dioxide transfer device for the control mechanism 51. Such transfer device might be a regenerative chemical absorption tower wherein a counter current flow of amine and the incoming exhaust gas results in removal of the carbon dioxide gas.

Carbon dioxide generated elsewhere in the fuel cell powerplant, such as in a fuel burner providing heat for reforming reaction, may also be used for addition of the carbon dioxide gas to the cathode region either directly or via an absorption tower as above described.

In order to illustrate the improved corrosion protection performance afforded by fuel cells in accordance with the invention, one such cell, designated call A, was constructed and operated and its operation compared to a conventional cell, designated cell B, operated in a standard manner. More particularly, both cells A and B contained similar internal structure. Cell electrodes comprised platinum supported on a high surface area carbon material, cell current collectors included fiber carbon material, and cell electrolyte structures comprised a phenolic fiber matrix filled with concentrated phosphoric acid. Anode gas in both cases was hydrogen. Cathode gas in cell B was conventional house compressed air. Cathode gas in cell A contained cathode air and in accord with the invention an added amount of carbon dioxide gas which amounted to about 3% of the total cathode gas.

Both cells were initially operated under load at a current density of 100 Amps/Ft$^2$ for 600 hours. Thereafter, both cells were operated under no load condition (open circuit voltage-OCV) for approximately 800 hours. This was done to accelerate carbon corrosion by operation at a high cathode potential. After this operation, the cells were again operated under load condition and performance checked. The above procedure was then twice repeated.

Figure 2:
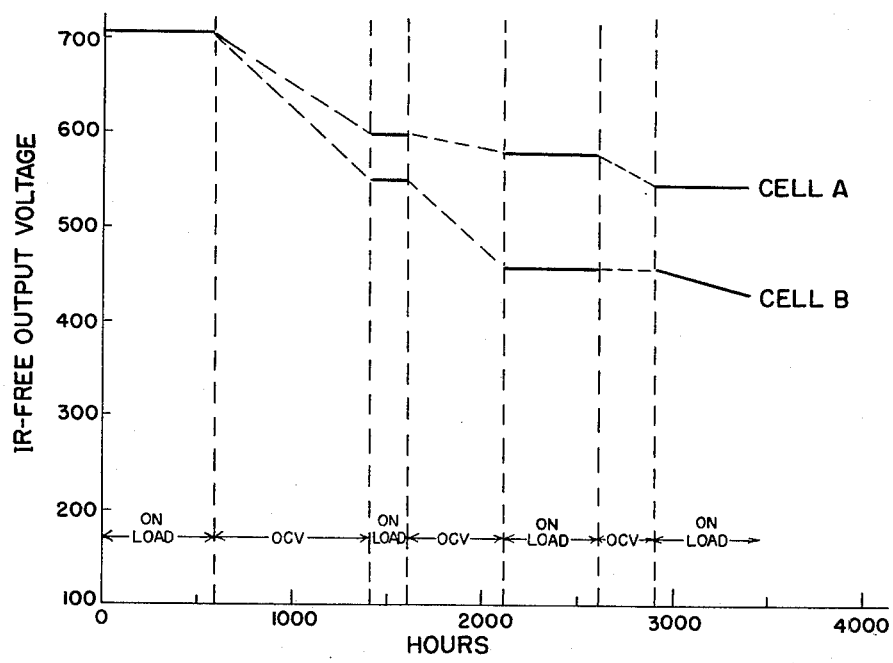
FIG. 2 illustrates the performance and behavior of two test fuel cells, one of which is operated in a conventional manner and the other of which is operated in accordance with the principles of the present invention.

FIG. 2 depicts the performance of each of the cells during the aforesaid operation. Ohmic resistance (IR)-free output voltage is plotted versus hours of operation. As can be appreciated, conventionally operated cell B suffered an additional 150 mv drop in output voltage after 3500 hours of operation as compared with cell A operated with the addition of carbon dioxide gas in accord with the invention. The benefit of the addition of carbon dioxide gas to cell A is therefore evident.

To verify that the improved performance of cell A was due to the suppression of the corrosion of the carbon containing cathode electrode, measurements of the so-called "$O_2$-gain" of each fuel cell were made at different times during the aforesaid operation sequence. $O_2$-gain in fuel cell practice is the difference in cell performance (IR-free output voltage) with air and oxygen as the cathode gases. This gain is an indicator of the diffusion polarization which, in turn, is an indicator of the carbon corrosion on the cell cathode side. The larger the $O_2$-gain for a given cell the greater will be the carbon corrosion. Moreover, the difference between the $O_2$-gains of two cells will be indicative of the difference in performance of these cells attributable to the difference in carbon corrosion of the cells.

Figure 3:
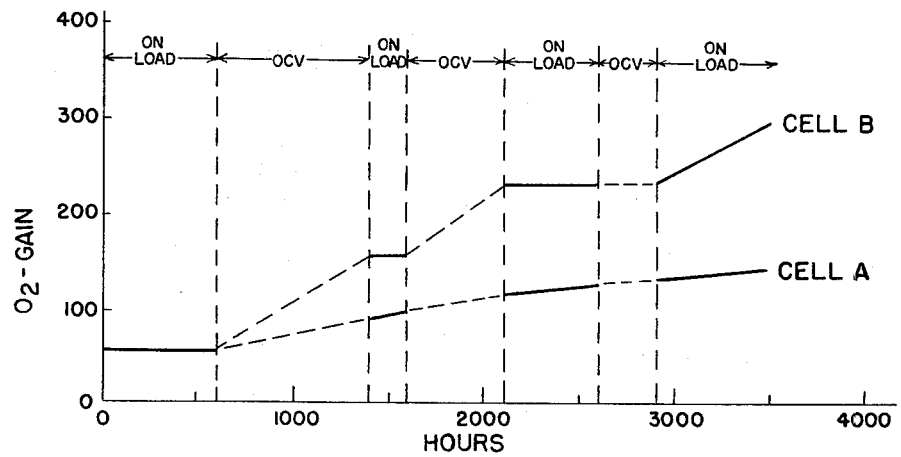
FIG. 3 shows the "oxygen-gain" behavior of the cells of FIG. 2.

FIG. 3 illustrates plots of the $O_2$-gains of cells A and B. As is evident, the difference in the $O_2$-gains of the cells after 3500 hours of operation was 150 mv, with cell A having a smaller $O_2$-gain than cell B. This, in turn, means that the 150 mv increased output of cell A depicted in FIG. 2 was due primarily to the lesser degree of carbon corrosion occurring in that cell relative to cell B.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method of generating electrical energy through electrochemical interaction comprising the steps of:
    providing a cell for subjecting an anode means to a fuel gas to generate free positive ions, for conveying the free positive ions to a cathode means, and for subjecting the cathode means to an oxidant gas;
    providing a carbon means within said cathode means; and supplying carbon dioxide gas to the region of said cell adjacent said carbon beams in sufficient amount to inhibit corrosion of said carbon means.

2. A method in accordance with claim 1 wherein:
    said carbon dioxide gas is supplied in sufficient amount to inhibit oxidation corrosion of said carbon means.

3. A method in accordance with claim 2 wherein:

said cell conveys said free positive ions through an electrolyte means.

4. A method in accordance with claim 3 wherein: said electrolyte means is phosphoric acid.

5. A method in accordance with claim 2 wherein: the amount of carbon dioxide gas supplied is greater than approximately 1 percent of the total volume of said carbon dioxide gas and oxidant gas.

6. A method in accordance with claim 5 wherein: the amount of carbon dioxide gas supplied is less than approximately 10 percent of the total volume of said carbon dioxide gas and oxidant gas.

7. A method in accordance with claim 5 wherein: the step of supplying includes coupling a portion of the exhaust gas generated when said anode means is subjected to a carbon dioxide containing fuel gas to the region of said cell occupied by said cathode means.

* * * * *